R. T. LOPER.
Muzzle-Loading Ordnance.
No. 3,685.
Patented July 30, 1844.
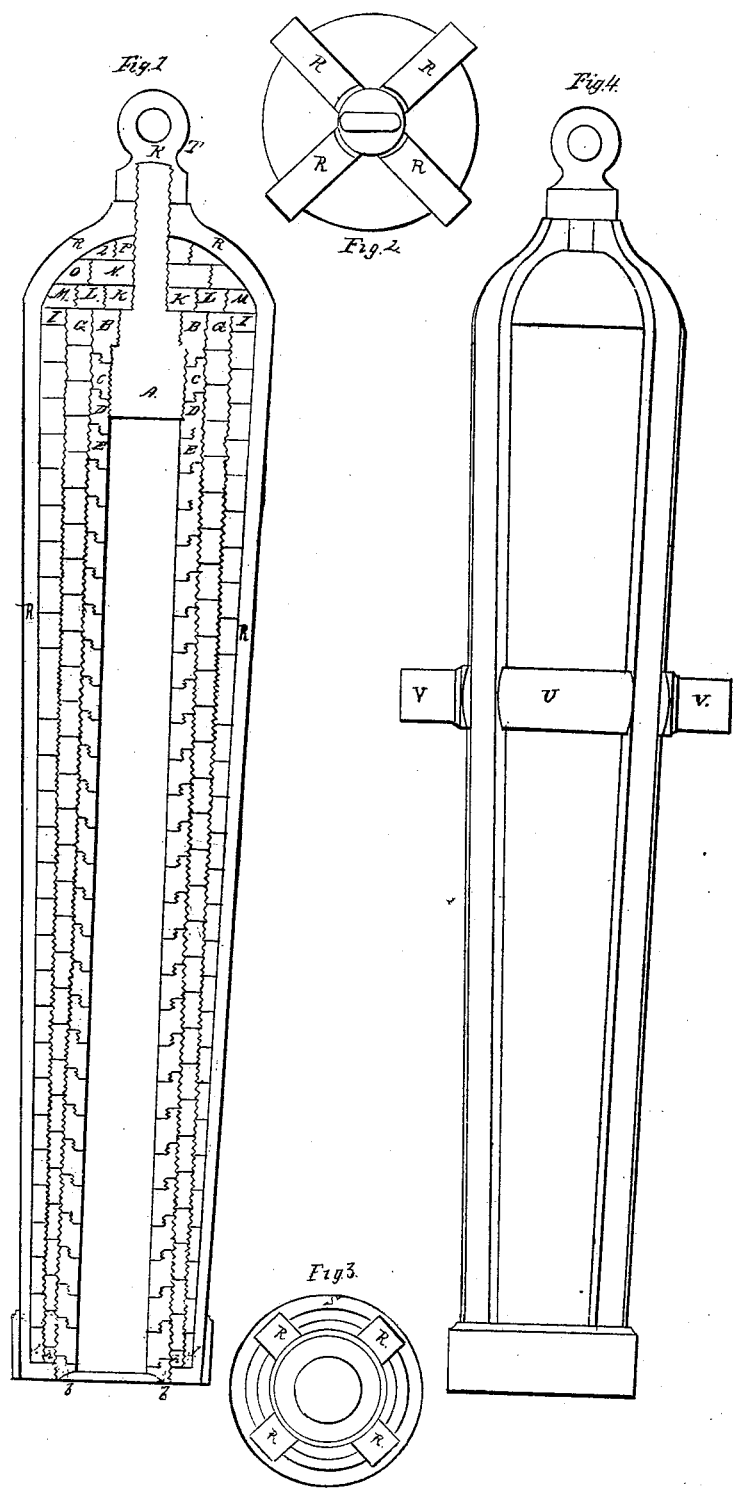

UNITED STATES PATENT OFFICE.

R. F. LOPER, OF PHILADELPHIA, PENNSYLVANIA.

IMPROVEMENT IN THE MODE OF CONSTRUCTING LARGE GUNS.

Specification forming part of Letters Patent No. 3,685, dated July 30, 1844.

*To all whom it may concern:*

Be it known that I, RICHARD F. LOPER, of the city and county of Philadelphia, and State of Pennsylvania, have invented a new and useful Improvement in the Construction of Large Wrought-Iron or Brass Cannon or other kinds of Ordnance, which renders them more secure than the present method of constructing them.

My invention consists in a method of building any piece of ordnance, either brass or iron, in sections of rings, or bands, which all screw in or on each other, and is described as follows, reference being had to the annexed drawings of the same, making part of this specification.

Figure 1 represents a longitudinal section of the gun; Fig. 2, the breech end of the gun; Fig. 3, a view of the muzzle end of the gun; Fig. 4, a side view of the gun finished.

In the old method of constructing large wrought-iron cannon, it has been the custom to weld together a mass of iron until the wished-for size is attained, and then bore this mass out for the reception of the powder, ball, &c. This method, it is contended, is liable to serious objections, on account of the impossibility of ascertaining the perfectness of the welding, and, also, the intense heat a very large mass is necessarily subjected to in the welding process, and for so long a time must affect the adhesiveness of the metal.

By my invention and improvement, I entirely overcome these objections by constructing pieces of ordnance of screw rings or bands which I put together as follows, referring to the annexed drawings:

A, Fig. 1, represents the breech-pin of the gun, which has a worm turned on it from one end to the other for the reception of some of the rings or bands.

B B, Fig. 1, is a ring or band with a worm on its inside corresponding to the worm on the breech-pin. This is screwed onto the breech-pin from behind.

C C, Fig. 1, is a ring similar to B B. This ring screws on the breech-pin from the muzzle or opposite end to that which the ring B B is screwed, and screws onto the end of ring B B, as shown by the drawings.

D D, Fig. 1, is the third and last ring of the first tier, which is screwed onto the breech-pin. The muzzle end projects over the end of the breech-pin, and the after or breech end screws onto the ring C C.

E E is a ring screwed onto ring C C, and left smooth on its inside to form part of the bore of the gun. The rest of the rings composing the cylinder down to the muzzle (marked F F,) are similar to ring E E, and screw into each other the whole length of cylinder, as may be seen by reference to the drawings.

After the cylinder and breech-pin are thus firmly secured, it is put into a lathe and a worm turned on it from one end to the other. On the cylinder thus prepared a series of screw-rings are screwed and so adjusted as to break joints with the first tier or cylinder. This second tier extends from breech to muzzle, and are represented on the drawings annexed by letters G G to *h h*. When the second tier of screw-rings are adjusted firmly in their places, the gun is again placed in the lathe and a worm turned on the outside from breech to muzzle for the reception of a third tier of ring-screws similar to those composing the second tier. This third tier (marked I I to J J on the drawings) are screwed on over the second tier, breaking joints with them, and are left smooth on their outside surfaces.

K L M N O P Q represent a number of screw-caps which are screwed on the end of the breech-pin, fitting the first one on the breech of gun, and the rest on each other to give strength and a finish.

Crossing the breech of the gun at right angles and screwed onto the end of the breech-pin, are two stays, which fitting snugly the shape of the gun continue along the sides or quarters and end at the muzzle. These stays (marked R R R R, Figs. 1, 2, 3) are secured by means of small screws along the sides of the gun by the ring S, Fig. 3, at the muzzle, and by the screw eye or cap T, Fig. 1, which screws onto the end of the breech-pin and secures the whole together. One of the third tier of screw-rings represented by U, Fig. 4, is made much thicker than the rest to afford support to the trunnions V V, Fig. 4. These trunnions screw into said ring U, Fig. 4. The gun is then bored out a trifle on the inside to perfect the inside surfaces, and polished ready for use.

The superior advantages of my method are, first, each and every piece can be thoroughly tested and proved before becoming a component part of the gun; secondly, the tenacious power of the screw is such as to make it the most secure way of joining several pieces of metal together; and also pieces of ordnance of any size or weight can be constructed and sent piecemeal over mountains, or to places where it might be impossible to transport a whole gun of the same size without much danger, expense, and labor.

I am aware that it has been proposed to make large guns of staves and hoops, but not like those constructed by me. I do not, therefore, claim simply making guns of hoops or rings and staves; but What I do claim as my invention, and desire to secure by Letters Patent, is—

Making guns by uniting the rings of each layer by screwing them into each other, and also by screwing other layers or ties onto the first, second, third, and so on to any extent, as described.

R. F. LOPER.

Witnesses:
B. T. McMARTIN,
N. D. THOMPSON.